(12) United States Patent
Bert

(10) Patent No.: US 11,947,834 B2
(45) Date of Patent: Apr. 2, 2024

(54) DATA STORAGE DEVICES WITH REDUCED BUFFERING FOR STORAGE ACCESS MESSAGES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/866,300

(22) Filed: Jul. 15, 2022

(65) Prior Publication Data

US 2024/0020051 A1 Jan. 18, 2024

(51) Int. Cl.
*G06F 3/06* (2006.01)

(52) U.S. Cl.
CPC .......... *G06F 3/0656* (2013.01); *G06F 3/0622* (2013.01); *G06F 3/0659* (2013.01); *G06F 3/067* (2013.01)

(58) Field of Classification Search
CPC ..... G06F 3/0656; G06F 3/0622; G06F 3/0659
See application file for complete search history.

(56) References Cited

U.S. PATENT DOCUMENTS

| 6,766,359 | B1 | 7/2004 | Oliveira et al. |
| 9,432,484 | B1 | 8/2016 | Xie et al. |
| 9,514,080 | B1 | 12/2016 | Chang |
| 9,537,953 | B1 | 1/2017 | Dadashikelayeh et al. |
| 10,664,217 | B1 | 5/2020 | Laha et al. |
| 10,984,044 | B1 | 4/2021 | Batsakis et al. |
| 11,106,734 | B1 | 8/2021 | Batsakis et al. |
| 11,410,475 | B2 | 8/2022 | Golov |
| 11,436,194 | B1 | 9/2022 | Salmon et al. |
| 11,650,868 | B2 | 5/2023 | Jha et al. |
| 11,733,931 | B1 | 8/2023 | Wu et al. |
| 2005/0240745 | A1 | 10/2005 | Tyer et al. |
| 2006/0026229 | A1 | 2/2006 | Ari et al. |
| 2008/0320233 | A1* | 12/2008 | Kinter ................ G06F 12/0804 711/143 |
| 2010/0005234 | A1 | 1/2010 | Ganga et al. |
| 2010/0095073 | A1 | 4/2010 | Caulkins |
| 2010/0274971 | A1* | 10/2010 | Solihin ............... G06F 12/0831 711/146 |

(Continued)

FOREIGN PATENT DOCUMENTS

WO 2023020055 2/2023

*Primary Examiner* — Gurtej Bansal
(74) *Attorney, Agent, or Firm* — Greenberg Traurig

(57) ABSTRACT

A method to provide network storage services to a remote host system, including: generating, from packets received from the remote host system, first control messages and first data messages; buffering, in a random-access memory of a memory sub-system, the first control messages for a local host system to fetch the first control messages, process the first control messages, and generate second control messages; sending the first data messages to a storage device of the memory sub-system without the first data messages being buffered in the random-access memory; communicating the second control messages generated by the local host system to the storage device of the memory sub-system; and processing, within the storage device, the second control messages and the first data messages to provide the network storage services.

20 Claims, 7 Drawing Sheets

(56) References Cited

U.S. PATENT DOCUMENTS

| | | |
|---|---|---|
| 2011/0246823 A1 | 10/2011 | Khan et al. |
| 2012/0278396 A1 | 11/2012 | Vuong |
| 2012/0311271 A1 | 12/2012 | Klein et al. |
| 2014/0282613 A1 | 9/2014 | Jea et al. |
| 2018/0217951 A1 | 8/2018 | Benisty et al. |
| 2018/0349487 A1 | 12/2018 | Garg et al. |
| 2019/0042501 A1 | 2/2019 | Trika |
| 2019/0044879 A1 | 2/2019 | Richardson et al. |
| 2019/0340024 A1 | 11/2019 | Brewer |
| 2020/0065018 A1 | 2/2020 | Hong |
| 2020/0117520 A1 | 4/2020 | Costa et al. |
| 2020/0186445 A1 | 6/2020 | Govindaraju et al. |
| 2020/0226077 A1 | 7/2020 | Kang et al. |
| 2022/0004668 A1 | 1/2022 | Dewan et al. |
| 2022/0121587 A1 | 4/2022 | Kragel et al. |
| 2022/0188028 A1 | 6/2022 | Mesnier et al. |
| 2022/0236902 A1 | 7/2022 | Pinto et al. |
| 2022/0245082 A1 | 8/2022 | Vijayashekar et al. |
| 2022/0300207 A1 | 9/2022 | Tsuji et al. |
| 2022/0405015 A1 | 12/2022 | Lee et al. |
| 2023/0029616 A1 | 2/2023 | Pandit et al. |
| 2023/0037870 A1 | 2/2023 | Jones |
| 2023/0088291 A1 | 3/2023 | Tsuji et al. |
| 2023/0127200 A1 | 4/2023 | Glimcher et al. |
| 2023/0214333 A1 | 7/2023 | Glimcher et al. |

\* cited by examiner

DATA STORAGE DEVICES WITH REDUCED BUFFERING FOR STORAGE ACCESS MESSAGES

TECHNICAL FIELD

At least some embodiments disclosed herein relate to memory systems in general, and more particularly, but not limited to memory systems configured to service data access requests received over computer networks.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
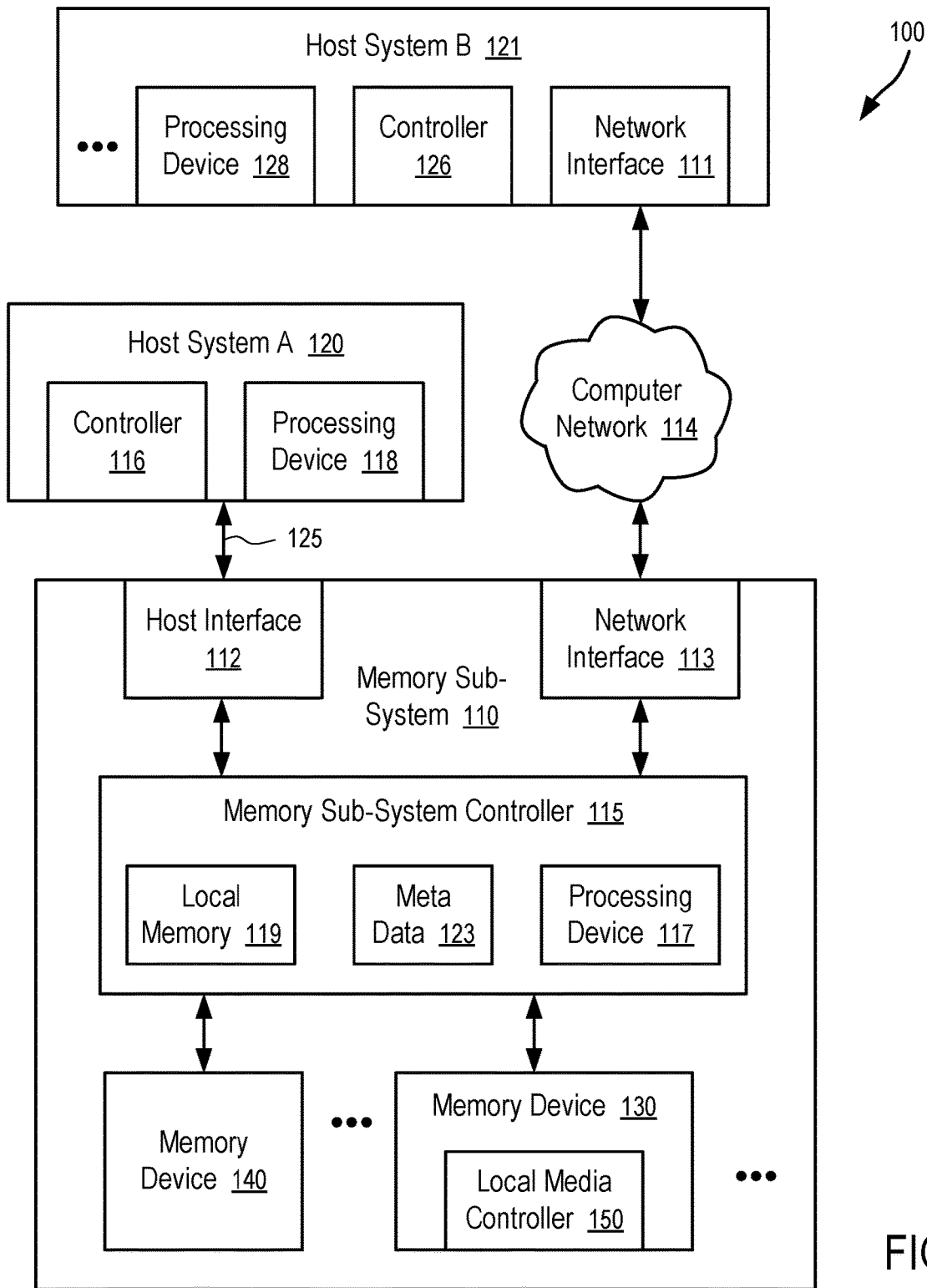
FIG. 1 illustrates an example computing system having a memory sub-system in accordance with some embodiments of the present disclosure.

At least some aspects of the present disclosure are directed to a memory sub-system configured with different processing paths for control messages and data messages. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional network-attached storage device is typically configured as a computing device having a central processing unit (CPU), a random-access memory, a network interface, and one or more memory devices to provide a storage capacity accessible over a computer network. The CPU is typically configured to run an operating system and/or a storage application to provide storage services in response to communications received in the network interface. Communications received in the network interface from a remote host system can include control messages and data messages. The messages are generated by the remote host system to manage and/or access the storage capacity of the network-attached storage device. The instructions executed in the CPU can be programmed to process the control messages and the data messages as input from the remote host system. In response to the messages, the CPU is configured via the instructions to authenticate users, manage access privileges and security settings, authorize access, manage the storage capacity, store data into the memory devices, retrieve data from the memory devices, etc.

For example, the control messages and the data messages received via the network interface of the conventional network-attached storage device are buffered in the random-access memory. The CPU is configured to fetch the messages, process the messages, and send corresponding messages to a local storage device, such as a solid-state drive. The solid-state drive can receive messages, execute the commands in the messages to store data, retrieve data from the memory devices, send retrieved data to the CPU, etc. The CPU can send the retrieved data to the network interface for transmission through a computer network to the remote host system.

Thus, in the conventional network-attached storage device, messages received in the network interface, including control messages and data messages, flow from the network interface through the CPU towards the storage capacity. Access responses, such as data retrieved in response to the read requests/commands, flow through the CPU for transmission by the network interface into the computer network.

However, it is inefficient to flow data messages through the CPU; and the CPU can be a bottleneck in processing power and communication bandwidth in scaling up storage capacity.

At least some aspects of the present disclosure address the above and other deficiencies by using different processing paths for control messages and data messages.

For example, a computing device providing network storage services can be configured with a storage device (e.g., a solid-state drive (SSD), a flash memory device, a ball grid array (BGA) SSD), a processing device (e.g., a microprocessor, a CPU), and a network interface connected to a remote host system as a storage client. The storage client (e.g., the network interface receiving messages from the remote host system) can write data into the storage device and retrieve data from the storage device. The storage client is configured to provide data messages to the storage device without going through the processing device. Control messages, such as administrative commands and management commands, are routed through the processing device. Instructions executed in the processing device are configured/programmed to process the control messages to exercise access control, to exercise security control, and to perform administrative operations.

For example, to reduce the burden on the CPU and improve efficiency, the computing device can be configured with different processing paths for certain control messages and other messages.

For example, the control messages on a separate processing path can include administrative and management commands used to create a namespace in the storage capacity, to map the namespace to a client, to authenticate users, to set security attributes (e.g., read only permitted vs. both read and write permitted), to provide authorization to which operation is allowed, to manage configuration changes, etc. Such control messages (e.g., for administrative and management functions) can be configured to flow through the processing device; and the processing device is configured via programmed instructions and/or other data to process the control message. Instructions executed in the processing device can be programmed to perform access control, administrative operations, management operations, etc., without operating on the data to be stored into and/or the data being retrieved from the storage device. Other messages, such as data messages containing write commands and data to be written into the storage device according to the write commands, read commands, data retrieved in response to the read commands, etc., can be configured to be communicated between the storage device and the storage client without going through the processing device.

As a result, the power consumption of the computing device can be reduced; the requirement on the communication bandwidth through the processing device (e.g., a microprocessor, a CPU) can be reduced; and the requirement on the computing power on the processing device can be reduced.

In contrast, a traditional network-attached storage device is configured to flow data messages through a CPU. In typical usages, administrative and management commands are only a small portion of messages, the data messages can be the majority of the messages going through in the network interface. Thus, the processing of the data messages by the CPU in the traditional network-attached storage device can place a very high weight on the CPU (e.g., lot of commands to process) and the random-access memory (e.g., lot of data buffering).

When data messages are communicated from a storage client to a storage device without going through the processing device (e.g., a microprocessor, a CPU) of the computing device, according to the present disclosure, the processing device is tasked to process a very small portion of messages (e.g., administrative and management commands, which are less than 0.1% of total commands). Other messages (e.g., more than 99.99% of total commands), including both command parts and data parts, can be routed to the storage device without going through the processing device. As a result, a less powerful processing device can be used to control and manage the storage; and the storage capacity can be easily scaled up by the processing device controlling multiple units, each containing a network interface and one or more local storage devices, as further discussed below.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 140), one or more non-volatile memory devices (e.g., memory device 130), or a combination of such.

In FIG. 1, the memory sub-system 110 is configured as a product of manufacture, usable as a component installed in a computing device. The memory sub-system 110 has a network interface 113 controlled by a memory sub-system controller 115 to communicate with a remote host system 121 over a computer network 114.

For example, the remote host system 121 can be configured with a processing device 128 (e.g., a microprocessor, a CPU), a memory controller 126, a network interface 111, and other components (e.g., random-access memory, sensors, and/or user interfaces). Instructions executed in the processing device 128 can be programmed to use the network interface 111 to access the storage capacity of the memory sub-system 110 using a storage protocol, such as internet small computer systems interface (iSCSI), fibre channel (FC), fibre channel over ethernet (FCoE), network file system (NFS), and server message block (SMB), or another protocol.

The memory sub-system 110 further includes a host interface 112 for a computer memory bus or a computer peripheral bus 125 connectable to a local host system 120 having a memory controller 116 and a processing device 118.

For example, instructions executed in the local host system 120 can be programmed to control, through the bus 125, the memory sub-system 110 according to serial advanced technology attachment (SATA), peripheral component interconnect express (PCIe), universal serial bus (USB), fibre channel (FC), serial attached SCSI (SAS), double data rate (DDR), small computer system interface (SCSI), open NAND flash interface, low power double data rate (LPDDR), non-volatile memory (NVM) express (NVMe), compute express link (CXL), or another technique.

Thus, a combination of the local host system 120 and the memory sub-system 110 can be used as a network-attached data storage device providing storage services to the remote host system 121 through the network interface 113 using a storage capacity of the memory devices 130, . . . , 140.

For example, the processing device 118 can be a microprocessor configured as a CPU of a computing device functioning a network-attached data storage device. The local host system 120 can be connected to one or more of the memory sub-systems (e.g., 110) via a peripheral bus 125. To scale up the storage capacity of the network-attached data storage device, more memory sub-systems (e.g., 110) can be connected to the local host system 120, with their respective network interfaces (e.g., 113) being connected to the computer network 114 and/or other computer networks.

Although FIG. 1 illustrates an example of one remote host system 121 connected to the network interface 113, multiple remote host systems (e.g., 121) can be configured on the computer network 114 to access the storage services of the network-attached storage device. Access to the storage services can be controlled via user credentials, host attributes, network addresses, and/or security settings, etc.

To reduce the burden on the local host system 120, at least a portion of control messages, among the messages received via the network interface 113 from the computer network 114 (e.g., from the remote host system 121), can be separated in the memory sub-system 110 from other types of messages, such as data messages. The memory sub-system 110 is configured to provide the control messages through the host interface 112 to the local host system 120 for processing without providing other messages, such as data messages, to the host interface 112, as discussed further below.

For example, network packets received in the network interface 113 can be processed by the memory sub-system controller 115 to recover or generate control messages and data messages. The memory sub-system controller 115 can include local memory 119 (e.g., random-access memory) and a processing device 117 configured to at least process the network packets from the network interface 113. The memory sub-system controller 115 can buffer the control messages in the local memory 119 for processing by the local host system 120; and the local host system 120 can place processing results in the local memory 119 for execution. The execution of the control messages processed by the local host system 120 can generate meta data 123 that control the storage operations performed for data messages.

The controller 115 can be configured to execute the commands of the data messages based on the meta 123 to store data into the memory devices 130, ..., 140, to retrieve data from the memory devices 130, ..., 140, and to transmit the retrieved data to the remote host system 121 using the network interface 113.

In some implementations, a memory device 130 can be a solid-state drive (e.g., a BGA SSD). Thus, the memory sub-system controller 115 can process and/or forward commands as processed by the local host system 120 and other commands to operate the memory device 130.

In some implementations, a portion of the memory sub-system controller 115 and at least a portion of the memory devices 130, ..., 140 are configured as a conventional storage device (e.g., SSD); and a remaining portion of the memory sub-system controller 115 can forward commands to the storage device for execution. Thus, a conventional storage device (e.g., SSD) can be used as a component or a local storage device in implementation of the memory sub-system 110.

In some implementations, multiple portions of the memory sub-system controller 115 and the memory devices 130, ..., 140 can be configured as multiple conventional storage devices (e.g., SSDs). In other implementations, the processing device 117 is shared by the memory devices 130, ..., 140 without being configured according to a conventional storage device (e.g., SSD). Thus, the configuration of the memory sub-system controller 115 and memory devices 130, ..., 140 are not limited to a particular connectivity and/or topology.

Bypassing the local host system 120 in the processing of the data messages greatly reduces the workloads of the local host system 120. Thus, the local host system 120 can be used to control multiple memory sub-systems (e.g., 110) in expanding storage capacity.

Since the memory sub-system 110, as a product, is configured to specifically service the storage access requests received via the network interface 113, the processing and communication bandwidth within the memory sub-system 110 can be designed and tailored according to the communication bandwidth of the network interface 113. Products similar to the memory sub-system 110 can be used as building blocks of a network storage facility controlled by the local host system 120. The capacity of the network storage facility can be easily scaled up via connecting more units to the computer network 114. Since the workload of the local host system 120 and communications to the local host system 120 are very low for controlling each memory sub-system 110, many memory sub-systems (e.g., 110) can be connected to the local host system 120 to scale up the capacity of the network storage facility without being limited by the communication bandwidth and/or processing power of an available local host system 120.

Figure 2:
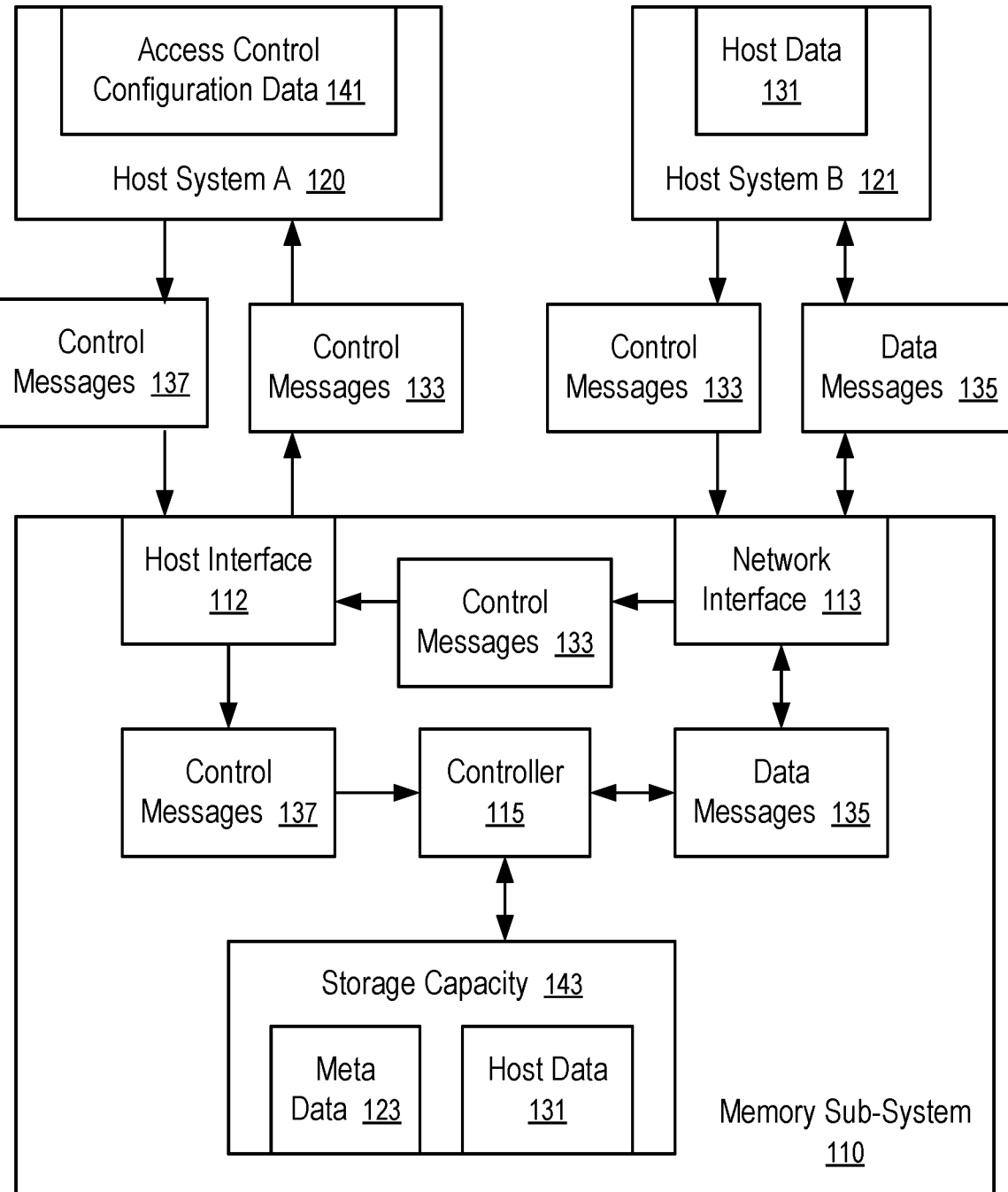
FIG. 2 shows different paths for processing control messages and data messages in a memory sub-system according to one embodiment.

FIG. 2 shows different paths for processing control messages and data messages in a memory sub-system according to one embodiment.

For example, the processing paths of FIG. 2 can be implemented using a memory sub-system 110 of FIG. 1 and/or the computing system 100 of FIG. 1.

In FIG. 2, a remote host system 121 is connected (e.g., over a computer network 114 as in FIG. 1) to the network interface 113 of the memory sub-system 110. The remote host system 121 can store host data 131 into the storage capacity 143 of the memory sub-system 110, and retrieve the host data 131 back from the memory sub-system 110, using a storage protocol, such as internet small computer systems interface (iSCSI), fibre channel (FC), fibre channel over ethernet (FCoE), network file system (NFS), and server message block (SMB), or another protocol.

Using the storage protocol, the remote host system 121 can send control messages 133 to the memory sub-system 110 to manage and/or administrate the storage capacity. For example, the host system can sign into the memory sub-system to start a session and/or a read/write operation. The control message 133 can include a command to generate a namespace in the storage capacity 143, to create, delete, open, or close a file in the namespace, to set security attributes (e.g., which files are readable and/or writable by which users), etc.

The control messages 133 received via the network interface 113 are forwarded to the host interface 112 connected to the local host system 120 for processing. Processed control messages 137 are provided to the controller 115 of the memory sub-system 110. Execution of commands/requests in the processed control messages 137 can generate meta data 123 that controls the data storage operations of the memory sub-system 110.

Some of the control messages 133 can be used to generate access control configuration data 141, such as identifications of user accounts, access privileges, user credentials, etc.

Optionally, the local host system 120 connected to the memory sub-system 110 can provide a user interface. An administrator can use the user interface to generate control messages 137 to perform administrative and/or management operations, such as creating accounts, record or change access credentials, generate namespaces, etc. At least a portion of the access control configuration data 141 can be generated via the user interface.

The access control configuration data 141 can be stored in part in the memory sub-system 110, or in another storage device connected to the local host system 120.

Subsequently, when the remote host system 121 sends a control message 133 for authentication or access, the local host system 120 can receive the control message 133 and use the access control configuration data 141 to determine whether to permit the access. If the request is permitted, the local host system 120 can send a control message 137 to the controller 115 of the memory sub-system to set up access. For example, in response to the control message 137, the controller 115 can set up a channel to the storage capacity. For example, the channel can include one or more queues in the local memory 119 for the read/write operations permitted by the control message 137. In some implementations, the channel can further include a portion of the meta data 123 generated to facilitate the read/write operations (e.g., for address translation).

To write host data 131 into the memory sub-system 110, the remote host system 121 can transmit a data message 135 containing a write command and data to be stored. In response to the data message 135, the controller 115 can write the received data into the storage capacity using the channel set up for the operation of the remote host system 121. Thus, the data message 135 is not routed to the local host system 120. Bypassing the local host system 120 in routing the data message 135 prevents the local host system 120 from accessing the host data 131 in the data message 135. Thus, the security for the host data 131 is improved.

To access the host data 131 stored in the memory sub-system 110, the remote host system 121 can send a data message 135 containing a read command. In response to the read command in the data message 135, the controller 115 can use the channel set up for the operation of the remote host system 121 to retrieve the host data 131 and generate a response in the form of a data message 135. The data message 135 is transmitted back to the remote host system 121 using the network interface 113 without going through the host interface 112. Thus, the local host system 120 does not have access to the host data 131 retrieved from the storage capacity 143, which also improves security for the host data 131.

Thus, by separating control messages 133 for routing into the local host system 120, only a very tiny portion of messages communicated between the remote host system 121 and the network interface 113 is routed through the local host system 120. Thus, the requirements on processing power and communication bandwidth on the local host system 120 are drastically reduced, while allowing the local host system 120 to exercise control over security, administrative, and management operations of the memory sub-system 110. The reduction makes it easy to scale up the storage capacity controlled by the local host system 120. For example, multiple memory sub-systems (e.g., 110) can be connected over a computer bus or a peripheral bus 125 to the local host system 120, while the memory sub-systems (e.g., 110) are separately connected to one or more computer networks (e.g., 114) via their respective network interfaces (e.g., 113).

In some implementations, the network interface 113 includes a logic circuit, a controller, and/or a processor configured to recover, identify, determine, or generate the control messages 133 and the data messages 135 from data packets received from a computer network 114.

In some other implementations, the processing power of the controller 115 is used to convert network packets received in the network interface 113 into the control messages 133 and the data messages 135. The controller 115 can include a processor configured with instructions to generate the control messages 137 and the data messages 135.

Figure 3:
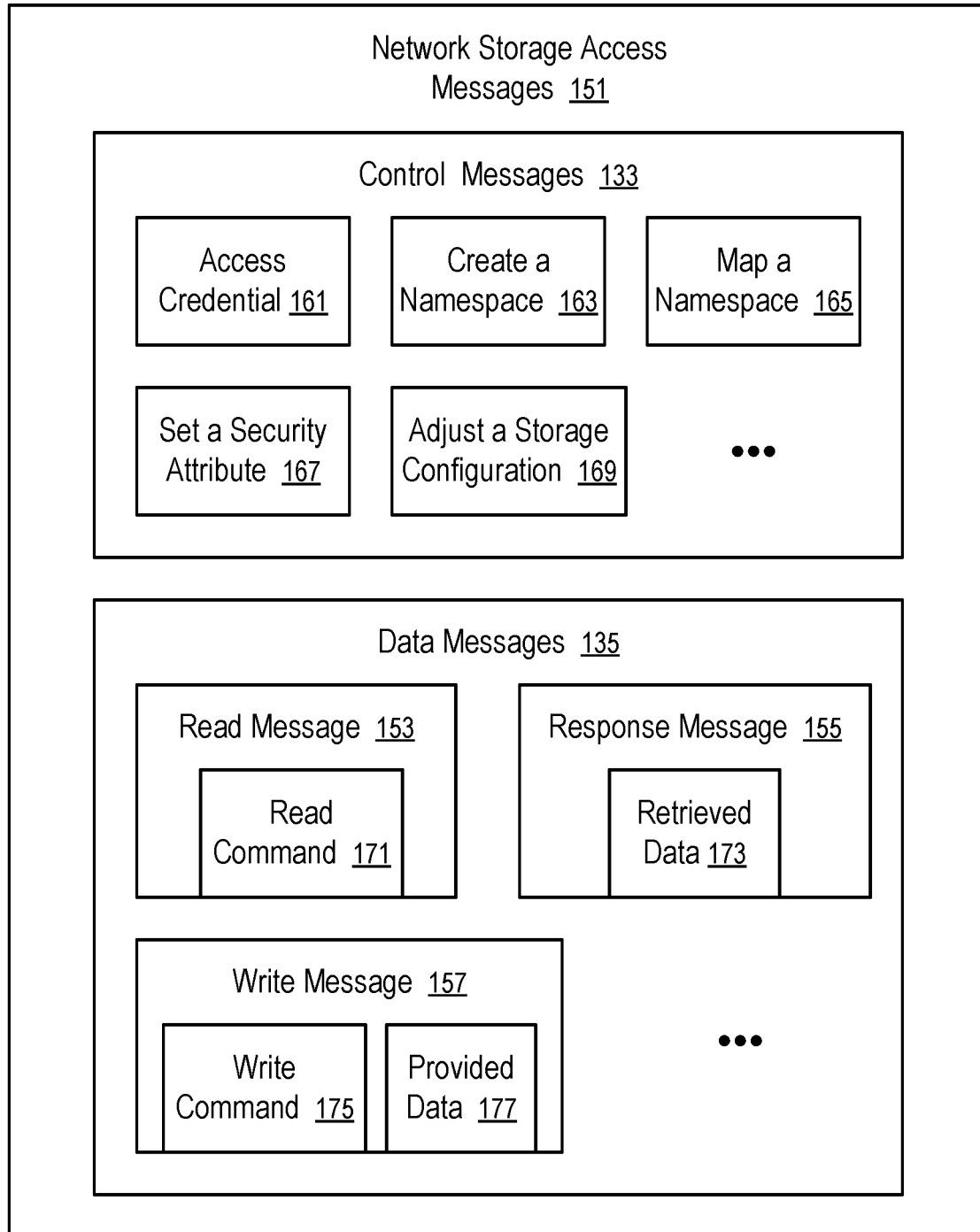
FIG. 3 shows a configuration of control messages and data messages for processing in a memory sub-system according to one embodiment.

FIG. 3 shows a configuration of control messages and data messages for processing in a memory sub-system according to one embodiment.

For example, the separation of control messages 133 and data messages 135 for routing in different processing paths in FIG. 2 can be implemented according to the configuration of FIG. 3.

Network storage access messages 151 communicated between a remote host system 121 and the network interface 113 of a memory sub-system 110 can be partitioned into control messages 133 and data messages 135 as illustrated in FIG. 3.

The control messages 133 can include a message containing access credential 161 to start a session or an operation.

The control messages 133 can include a message containing a command to create a namespace 163 in the storage capacity 143.

The control messages 133 can include a message containing a command to map a namespace 165 in the storage capacity 143.

The control messages 133 can include a message containing a command to set a security attribute 167 in the storage capacity 143 (e.g., a read permission for a user, a write permission for a user).

The control messages 133 can include a message containing a command to adjust a storage configuration 169 (e.g., move a file).

The control messages 133 can include other commands that can change meta data 123 in the memory sub-system 110 to control and organize host data 131. However, the control messages 133 do not include host data 131 to be written into the memory sub-system 110 and/or host data 131 being read from the memory sub-system 110.

The data messages 135 can include a read message 153 having a read command 171 (and an address of data to be read), a response message 155 having data 173 retrieved from the storage capacity 143, a write message 157 having a write command 175 and provided data 177 to be written into the storage capacity 143, a message having a trim or deallocation command, etc.

The control messages 133 are routed through the host interface 112 of the memory sub-system 110, but the data messages 135 are not routed through the host interface 112 of the memory sub-system 110. In some implementations, network storage access messages 151 received for the network interface 113 in one storage protocol is converted to control messages 133 and data messages 135 in another protocol for a local storage device (e.g., a solid-state drive, a memory device 130).

In one aspect, a method is provided to process network messages to access storage of a memory sub-system. For example, the method can be performed by a storage manager configured in a memory sub-system 110 and/or a local host system 120 of FIG. 1 to have different processing paths illustrated in FIG. 2 using a configuration of FIG. 3. For example, a storage manager in the memory sub-system 110 can be implemented to perform operations discussed in connection with the memory sub-system 110; and the storage manager can be implemented via a logic circuit and/or a processing device 117 of the memory sub-system controller 115, and/or instructions programmed to be executed by the processing device 117. For example, a storage manager in the local host system 120 can be implemented to perform operations discussed in connection with the local host system 120; and the storage manager can be implemented via a logic circuit and/or a processing device 118 of the host system 120, and/or instructions programmed to be executed by the processing device 118.

In the method, a network interface 113 of a memory sub-system 110 receives, over a computer network 114, packets from a remote host system 121.

For example, the memory sub-system 110 can have a storage device, such as a memory device 130, a solid-state drive having one or more memory devices 130, . . . , 140 to provide a storage capacity 143 accessible to the remote host system 121 over a computer network 114. The memory sub-system 110 can have a host interface 112 operable on a peripheral bus 125 connected to a local host system 120 to process a portion of network storage access messages 151 generated from the packets. The memory sub-system 110 can have a storage manager (e.g., implemented via a controller 115 coupled to the host interface 112, the network interface 113, and the solid-state drive).

In the method, the memory sub-system 110 determines (e.g., using a storage manager), from the packets, first control messages 133 and first data messages 135 that include first host data 131 provided by the remote host system 121.

For example, the remote host system 121 can access the storage functions of the memory sub-system 110 using a storage protocol, such as internet small computer systems interface, fibre channel, fibre channel over ethernet, network file system, or server message block, or another protocol. The first control messages 133 and first data messages 135 can be determined from the messages transmitted by the remote host system 121 using the storage protocol. In some implementations, the first control messages 133 and first data messages 135 are recovered from the packets received at the network interface 113. In some implementations, the messages transmitted from the remote host system 121 are translated to a protocol for accessing the solid-state drive.

In the method, the memory sub-system 110 sends (e.g., using the storage manager), through a host interface 112 of the memory sub-system 110, the first control messages 133 to a local host system 120.

For example, the host interface 112 can be configured according to a computer peripheral bus 125 according to serial advanced technology attachment, peripheral component interconnect express, universal serial bus, fibre channel, serial attached small computer system interface, double data rate, small computer system interface, open NAND flash interface, low power double data rate, non-volatile memory express, or compute express link, or another computer bus technique.

In the method, the local host system 120 processes (e.g., via a storage manager), the first control messages 133 to generate second control messages 137.

In the method, the memory sub-system 110 receives (e.g., via its storage manager), via the host interface 112 from the local host system 120, the second control messages 137 responsive to the first control messages 133.

In the method, the memory sub-system 110 processes (e.g., via its storage manager), the second control messages 137 and the first data messages 135, without sending the first data message 135 and/or the first host data 131 to the local host system 120, to write the first host data 131 into a memory device 130 of the memory sub-system 110.

For example, the first data messages 135 can include a write command 175; and the first host data 131 (e.g., provided data 177) can be written into a memory device (e.g., 130) of the memory sub-system according to the write command without the write command 175 and/or its data 177 going through the host interface 112.

For example, the first data message 135 can include a read command 171. In response, the memory sub-system 110 can read second host data (e.g., data 173) from the solid-state drive and/or a memory device (e.g., 130) according to the read command 171 specified in the first data messages 135. The memory sub-system 110 generates second data messages (e.g., response message 155) containing the second host data (e.g., data 173). The memory sub-system 110 transmits, via the network interface 113, the second data messages (e.g., response message 155) to the remote host system 121 without the second host data (e.g., retrieved data 173) and/or the second data messages (e.g., response message 155) going through the host interface 112.

For example, the memory sub-system 110 can be configured to process the second control messages 137 to generate meta data 123 according to which the first host data 131 is written into the solid-state drive (e.g., the memory device 130) and the second host data (e.g., data 173) is retrieved from the solid-state drive (e.g., the memory device 130).

For example, the first control messages include a command (e.g., create a namespace 163, map a namespace 165) to create, map, or delete a namespace; and the meta data 123 is associated with the namespace.

For example, the memory sub-system 110 can be configured to process the second control messages 137 to set up a channel to write the first host data 131 or read the second host data (e.g., data 173).

For example, the memory sub-system 110 can have random-access memory (e.g., memory 119); and the channel can include one or more queues configured, according to the second control messages, for writing data into, and/or retrieving data from, the solid-state drive.

For example, the channel can be configured with data used by the controller 115 of the memory sub-system 110 to perform address translation to write the first host data 131 into the solid-state drive.

For example, the first control messages 133 include a credential 161 to access a storage capacity 143 of the solid-state drive. The local host system 120 can validate the credential 161 based on access control configuration data 141.

For example, the first control messages 133 include a command to set a security attribute 167, and/or a command to adjust a storage configuration 169 in the solid-state drive.

The local host system 120 is configured to process the first control message 133 to exercise security control and perform administrative operations.

In at least some embodiments, the memory sub-system 110 has a random-access memory (e.g., local memory 119) configured to buffer control messages 133 for processing by the local host system 120 without buffering the data messages 135.

For example, the memory sub-system 110 can be configured with a storage device capable of processing storage requests received from a local host system via a computer bus or peripheral bus according to a storage protocol. The storage device can buffer its received commands and schedule the executions of the received commands.

After control messages 133 and the data messages 135 are generated from network data packets received by the network interface 113 from the computer network 114, the data messages 135 can be forwarded to the storage device for processing without being buffered into the random-access memory. In contrast, the control messages 133 are buffered in the random-access memory; and the local host system 120 can fetch the control messages 133 form the random-access memory. Control messages 137 generated by the local host system 120 from processing the control message 133 can be sent to the storage device without being buffering in the random-access memory.

For example, the processing device 118 of the local host system 120 can be configured as a CPU of the computing device having the local host system 120 and the memory sub-system 110. The random-access memory is accessible to the processing device 118 via the memory controller 116 in the local host system 120. The random-access memory can be accessed by the processing device 118 as at least a portion of the main memory of the host system 120. The storage device and the network interface 113 can function as peripheral devices in the computing device controlled by the processing device 118. The network interface 113 can have a direct wired connection (e.g., via a peripheral bus) to the storage device. Thus, data messages can be forwarded from the network interface 113 to the storage device without going through the random-access memory of the local host system 120 and/or without going through the local host system 120.

For example, under the control of the remote host system 121, the network interface 113 can function as a storage client. The storage client can be configured to function as a host of the storage device in sending read/write commands to the storage device and receiving responses (e.g., using a peer to peer protocol). In addition, the storage client is configured to queue control messages 133 in the random-access memory that functions as part of the main memory of the local host system 120. In response to the control messages 133, the local host system 120 can generate control messages 137 for execution in the storage capacity 143. In some implementations, the control messages 137 are buffered in the random-access memory for fetching by the storage device; in other implementations, the control messages 137 can be sent to the storage device directly without going through the random address memory.

Figure 4:
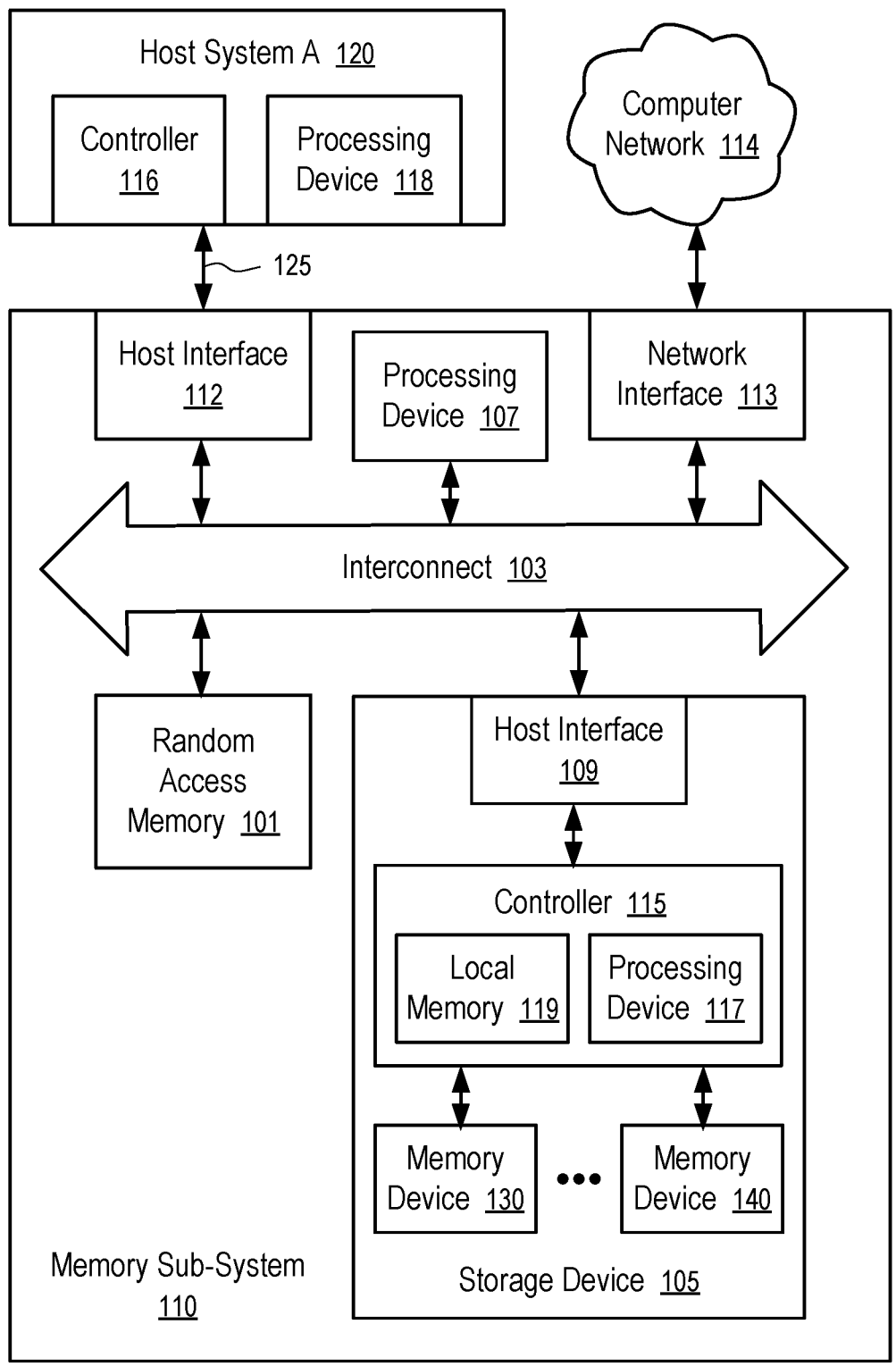
FIG. 4 shows a computing device configured to service network storage requests using a local storage device according to one embodiment.

FIG. 4 shows a computing device configured to service network storage requests using a local storage device according to one embodiment.

For example, the memory sub-system 110 of FIG. 1 can be implemented in a way as configured in FIG. 4.

In FIG. 4, the memory sub-system 110 has a storage device 105 having memory devices 130, . . . , 140 to provide a storage capacity 143 accessible over a computer network 114. For example, the storage device 105 can be configured as a solid-state drive usable on a computer peripheral bus.

The storage device 105 has a host interface 109 configured to communicate on a bus (e.g., interconnect 103) to receive commands and send responses. For example, the interconnect 103 can have a bus of a same type as the bus 125 that connects the host interface 112 of the memory sub-system 110 and a local host system 120. For example, the host interfaces 112 and 109 can support a same communications protocol. In some implementations, the bus 125 is part of the interconnect 103 connecting the local host system 120 to the random-access memory 101 and the storage device 105. The random-access memory 101 can be implemented using dynamic random-access memory (DRAM), synchronous dynamic random-access memory (SDRAM), static random-access memory (SRAM), three-dimensional cross-point ("3D cross-point") memory, etc.

In FIG. 4, a processing device 107 is coupled to the network interface 113 to process the packets received from the computer network 114 and to generate packets sent into the computer networks 114 to provide response messages 155.

Based on packets received from the computer network 114, the processing device 107 can generate control messages 133 and data messages 135 to access the storage services of the storage device 105. The processing device 107 can buffer the control messages 133 in the random-access memory 101 (e.g., in one or more queues configured in the random-access memory 101) for the host system 120 to process.

Instructions executed in the local host system 120 can fetch control messages 133 buffered in the random-access memory 101 and process the fetched control messages 133 in connection with access control configuration data 141. For example, the local host system 120 can be configured via instructions to identify and reject unauthorized access requests and non-permissive requests. Permitted control messages 137 are transmitted by the local host system 120 to the storage device 105 without going through the random-access memory 101. Alternatively, one or more queues can be configured in the random-access memory 101 to receive the processed control messages 137; and the processing device 107 of the memory sub-system 110 can be configured to transmit the processed control messages 137 to the storage device 105. Alternatively, the storage device 105 can be configured to access the queues and fetch the processed control messages 137 for execution within the storage device 105.

The storage device 105 can have a host interface 109 configured to communicate on a computer bus or a peripheral bus of the interconnect 103. Optionally, the random-access memory 101, the host interface 109, and the local host system 120 are connected on a same bus. In another implementation, a memory bus connects the local host system 120 and the random-access memory 101 of the memory sub-system 110; and a peripheral bus connects the local host system 120 and the host interface 109 of the storage device 105 in the memory sub-system 110.

The storage device 105 can have a controller 115 including a local memory 119 and a processing device 117, similar to the memory sub-system controller 115 in FIG. 1. The controller 115 can buffer, in the local memory 119, commands and data received via the host interface 109. The processing device 117 can be configured via instructions and logic circuits to execute write commands to store data into the memory devices 130, . . . , 140, to execute read commands to retrieve host data 131, etc.

In some implementations, the storage device 105 is a solid-state drive (SSD) or a BGA SSD. In other embodiments, a hard disk drive can be used as the storage device 105.

In contrast to the processing of control messages 133 generated by the processing device 107, the data messages 135 generated by the processing device 107 from the data packets from the computer network 114 can be sent to the storage device 105 via the interconnect 103 directly without going through the random-access memory 101. Similarly, the retrieved data 173 can be used to generate response messages 155; and the processing device 107 can generate the packets for transmitting the response messages 155 via the network interface 113.

Figure 5:
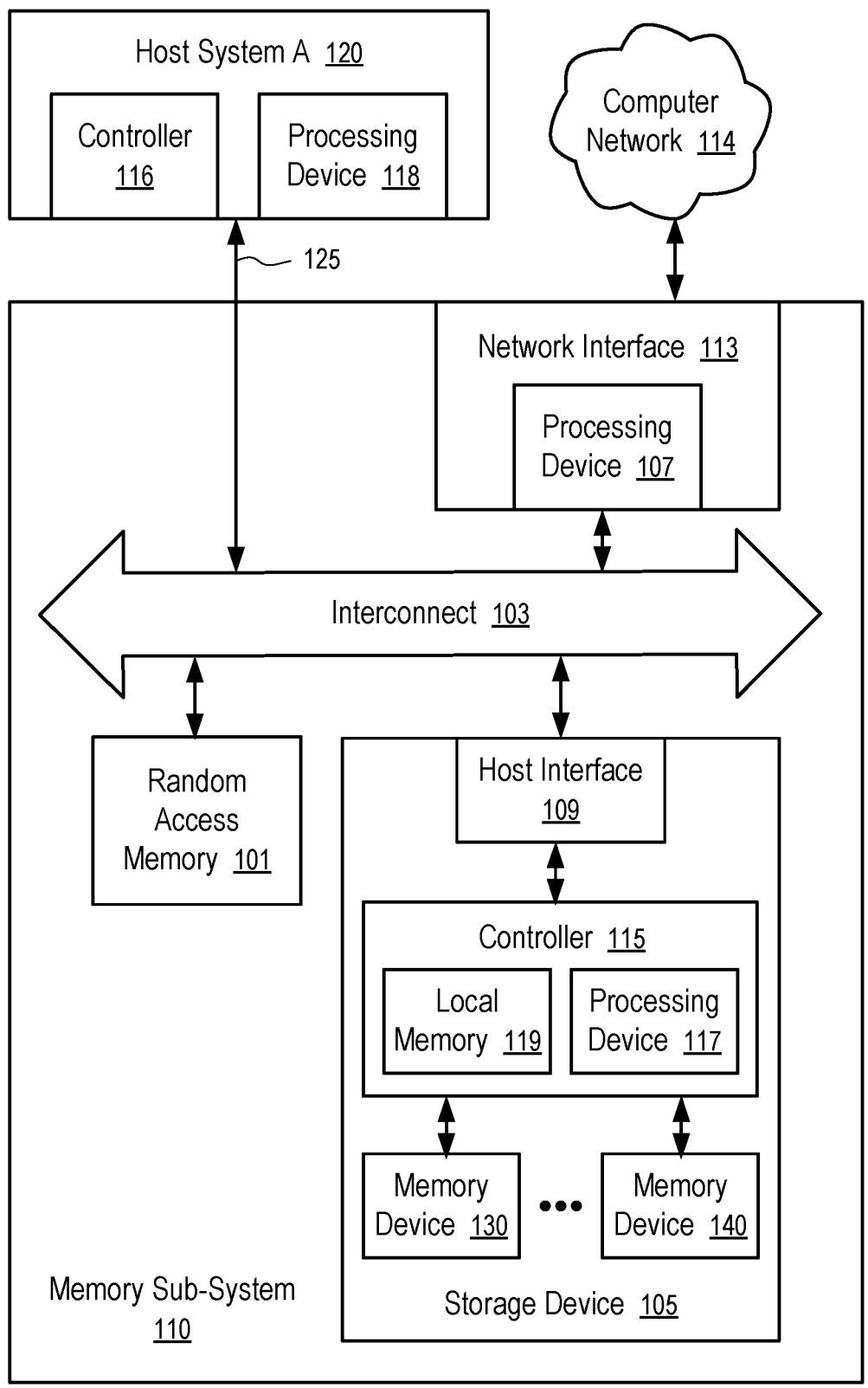
FIG. 5 shows a computing device having a network interface configured to generate data messages for a local storage device according to one embodiment.

In some implementations, the processing device 107 is configured as part of the network interface 113, as in FIG. 5

FIG. 5 shows a computing device having a network interface configured to generate data messages for a local storage device according to one embodiment.

For example, the memory sub-system 110 of FIG. 1 can be implemented in a way as configured in FIG. 5.

In FIG. 5, the network interface 113 is configured with a processing device 107 to generate control messages 133 and data messages 135 from packets received from the computer network 114. The processing device 107 is further configured to convert response messages 155 into packets for transmission into the computer network 114.

The network interface 113 can function as a peripheral device connected to the interconnect 103. In some implementations, a computer peripheral bus 125 is further connected to the random-access memory 101, the network interface 113, and the storage device 105 to function as the interconnect 103.

In FIG. 5, the memory sub-system 110 does not contain a CPU. As a result, the memory sub-system 110 is not operable standalone. When the memory sub-system 110 is connected to the local host system 120 to form a computing device, the processing device 118 of the local host system 120 is configured as the CPU of the computing device.

The processing device 107 in the network interface 113 is configured to queue control messages 133 in the random-access memory 101 for processing by the local host system 120. The processing device 107 in the network interface 113 is further configured to send the data messages 135 directly to the storage device 105 (e.g., using a peer to peer protocol) without the data messages 135 going through the random-access memory 101 and/or the local host system 120.

Similarly, the local host system 120 can send the processed control messages 137 directly to the storage device 105 without going through the random-access memory 101. Alternatively, the processed control messages 137 are queued in the random-access memory 101 for fetching by the storage device 105 (or for re-transmission by the processing device 107 to the storage device 105).

The storage device 105 in FIG. 5 can be configured in a way similar to the storage device 105 in FIG. 4 in capable of receiving, via its host interface 109, control messages 137 and the data messages 135, executing commands in the received messages, and generating response messages 155 without assistance from outside of the storage device 105.

In some implementations, the memory devices 130, ..., 140 in the memory sub-system 110 (e.g., as in FIG. 1, FIG. 4 and FIG. 5) are configured to have a throughput in writing data to match with the communication bandwidth of the network interface 113 for peak performance and for reduced needs for buffering in local memory 119.

FIG. 4 and FIG. 5 illustrate examples of one storage device 105 being connected to the interconnect 103 of the memory sub-system 110. Optionally, multiple storage devices 105 are configured in the memory sub-system 110 to operate in parallel to match the bandwidth of the network interface 113.

Figure 6:
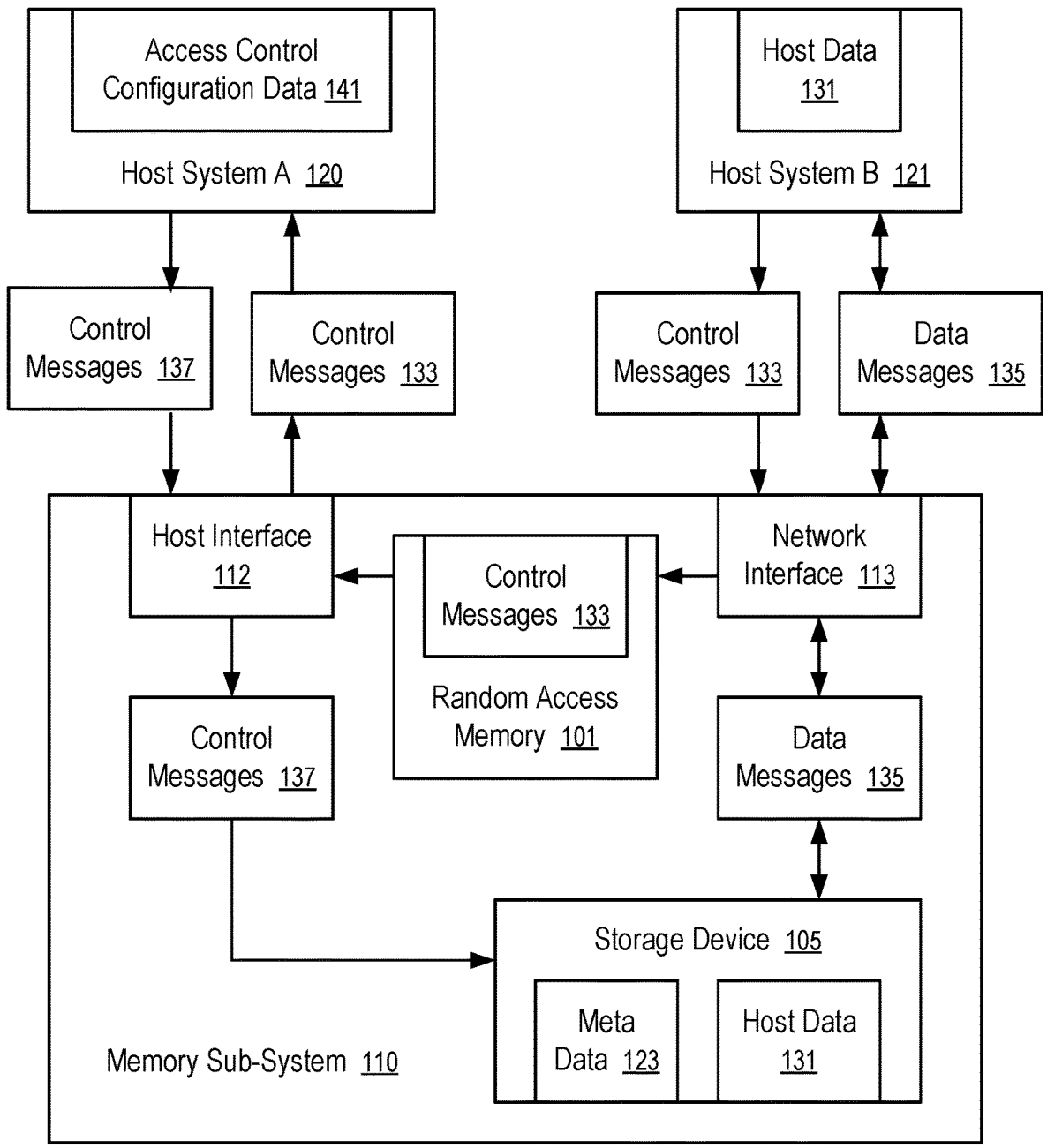
FIG. 6 shows buffering control messages for processing by a local host system without buffering data messages forward to a local storage device according to one embodiment.

FIG. 6 shows buffering control messages for processing by a local host system without buffering data messages forward to a local storage device according to one embodiment.

For example, the buffering technique of FIG. 6 can be implemented in the memory sub-system 110 of FIG. 1, FIG. 4 and/or FIG. 5.

In FIG. 6, the control messages 133 and the data messages 135 from the remote host system 121 are separate for different processing paths as in FIG. 2. For example, the processing device 107 configured in the network interface 113 as in FIG. 5 can generate the control messages 133 and the data messages 135. For example, a processing device 107 coupled to the network interface 113 via an interconnect 103 as in FIG. 4 can generate the control messages 133 and the data messages 135. For example, a processing device 117 of a memory sub-system controller 115 as in FIG. 1 can generate the control messages 133 and the data messages 135.

The control messages 133 are buffered in the random-access memory 101 of the memory sub-system 110 for processing by the host system 120. Instructions executed in the host system 120 can be programmed (e.g., as an operating system and/or a storage application) to fetch the control messages 133 from the random-access memory 101 for processing in connection with access control configuration data 141.

For example, if the access credential 161 provided in a control message 133 is invalid in view of the access control configuration data 141, the host system 120 can transmit a corresponding control message 137 to indicate an invalid access, causing the storage device 105 to reject subsequent read commands 171, write commands 175, and other commands associated with the access credential 161.

For example, the indication of an invalid access can be configured to cause the storage device 105 to skip opening a session or connection and/or a channel to access the storage capacity 143 of the storage device 105.

For example, if the access credential 161 is valid, the host system 120 can transmit a corresponding control message 137 to indicate a valid access, causing the storage device 105 to accept subsequent read commands 171, write commands 175, and other commands associated with the access credential 161, for execution within the storage device 105.

For example, the indication of a valid access can be configured to cause the storage device 105 to open a session or connection and/or a channel usable for subsequent read and/or write access to the storage capacity 143 of the storage device 105.

In contrast, the data messages 135 are routed to the storage device 105 directly without going through the random-access memory 101, the host interface 112, or the local host system 120. In some implementations, the host interface 112 is a bus interface to the interconnect 103 of the memory sub-system 110.

The arrangement of not buffering the data messages 135 in the random-access memory 101 can reduce the capacity requirement of the random-access memory 101 and reduce energy consumption.

Figure 7:
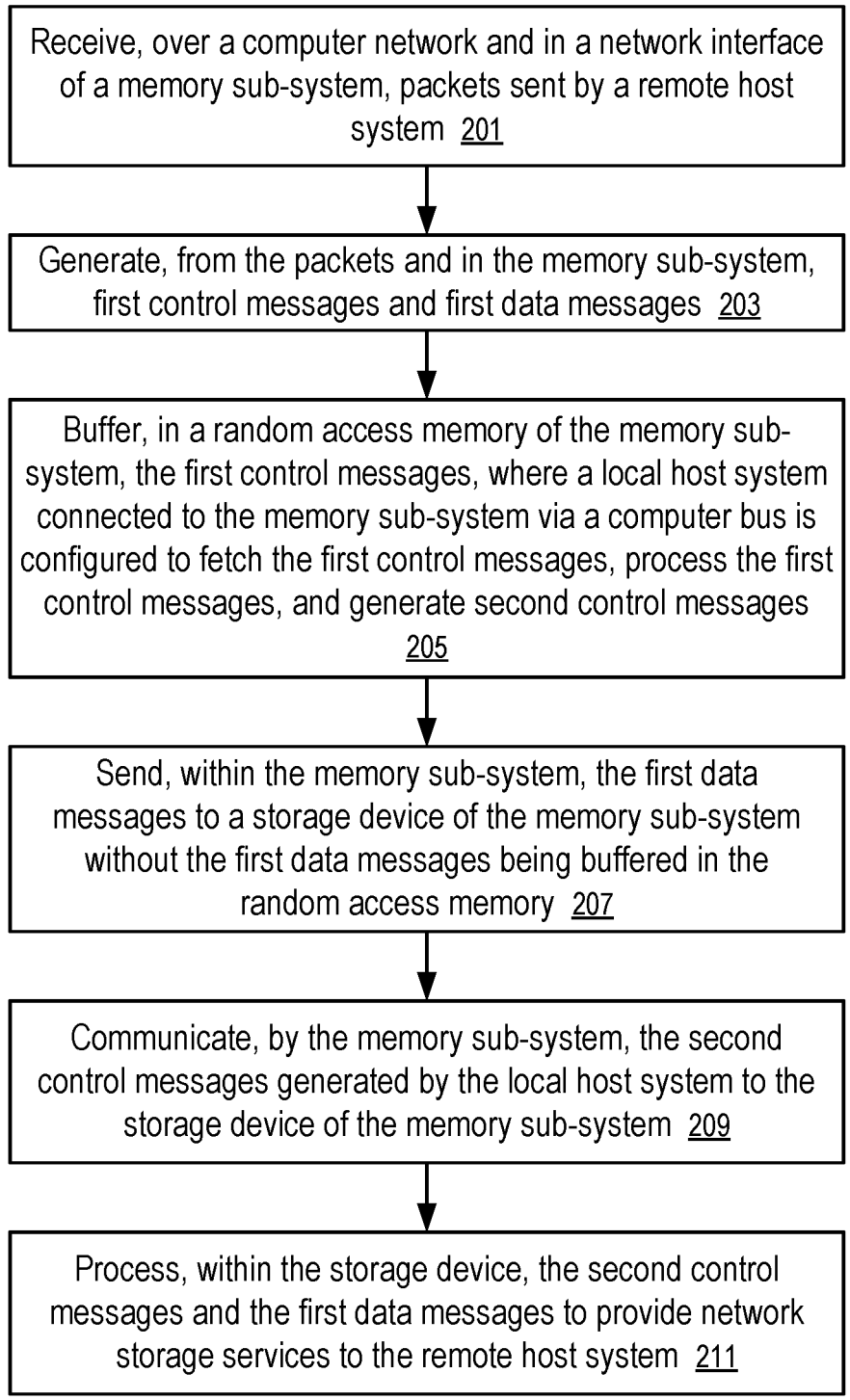
FIG. 7 shows a method to process network messages to access storage of a memory sub-system according to one embodiment.

FIG. 7 shows a method to process network messages to access storage of a memory sub-system according to one embodiment.

For example, the method of FIG. 7 can be performed by a storage manager configured in a memory sub-system 110 and/or a local host system 120 of FIG. 1, FIG. 4, and/or FIG. 5 to have different processing paths illustrated in FIG. 2 and/or FIG. 6 using a configuration of FIG. 3. For example, a storage manager in the memory sub-system 110 can be implemented to perform operations discussed in connection with the memory sub-system 110; and the storage manager can be implemented via a logic circuit and/or a processing device 117 or 107 of the memory sub-system controller 115, and/or instructions programmed to be executed by the processing device 117. For example, a storage manager in the local host system 120 can be implemented to perform operations discussed in connection with the local host system 120; and the storage manager can be implemented via a logic circuit and/or a processing device 118 of the host system 120, and/or instructions programmed to be executed by the processing device 118.

At block 201, a network interface 113 of a memory sub-system 110 receives, over a computer network 114, packets sent by a remote host system 121.

For example, the memory sub-system 110 can be connected to a local host system 120 to form a network-attached computing device to provide network storage services. The local host system 120 can have a processing device 118 (e.g., a microprocessor) configured via instructions to function as a central processing unit of the memory sub-system 110.

The memory sub-system 110 has an interconnect 103 connected to a random-access memory 101 accessible by the processing device 118 as a main memory, a storage device 105 (e.g., a solid-state drive), and the network interface 113.

For example, the storage device 105 can be a solid-state drive having a controller 115, at least one memory device 130, ..., 104 having memory cells formed on at least one integrated circuit die, and a host interface 109 connected to the interconnect 103.

At block 203, the memory sub-system 110 generates, from the packets, first control messages 133 and first data messages 135.

For example, the memory sub-system 110 can have a processing device 107 (e.g., a processor or a logic circuit) configured to generate the first control messages 133 and first data messages 135 sent by the remote host system 121.

For example, the processing device 107 can be separate from the network interface 113 as in FIG. 4. The processing device 107 communicates with the network interface 113 via the interconnect 103 (e.g., a peripheral bus).

For example, the processing device 107 can be part of the network interface 113 as in FIG. 5.

The processing device 118 of the local host system 120 (e.g., functioning as a central processing unit of the computing device) is not used in the processing of the network packets and in the generation of the first control messages 133 and first data messages 135.

At block 205, the memory sub-system 110 buffers the first control messages 133 in a random-access memory 101. A local host system 120 connected to the memory sub-system 110 via a computer bus 125 is configured via instructions to fetch the first control messages 133 from the random-access memory 101, process the first control messages 133 in view of access control configuration data 120, and generate second control messages 137.

For example, the second control messages 137 can be communicated from the local host system 120 to the storage device 105 without being buffered in the random-access memory 101. Alternatively, the local host system 120 can buffer, in the random-access memory 101 of the memory sub-system 110, the second control messages 137 before the second control messages 137 are sent to the storage device.

For example, in some implementations, the processing device 107 of the memory sub-system 110 and/or the network interface 113 can retrieve the second control messages 137 from the random-access memory 101 and send the second control messages 137 to the storage device 105. In other implementations, the storage device 105 can fetch the second control messages 137 from the random-access memory 101 without assistance from the processing device 107 and/or the processing device 118.

At block 207, the memory sub-system 110 sends the first data messages 135 to a storage device 105 of the memory sub-system 110 without the first data messages 135 being buffered in the random-access memory 101.

For example, the processing device 107 of the memory sub-system 110 and/or the network interface 113 can send the first data messages 135 and/or the second control messages 137 to the storage device 105 using a peer to peer protocol over the interconnect 103.

For example, the remote host system 121 can send storage requests to the network interface 113 according to a first storage protocol; the processing device 107 of the memory sub-system 110 and/or the network interface 113 can generate first data messages 135 according to a second storage protocol of the storage device 105. The second storage protocol can be different from the first storage protocol. In some implementations, the second storage protocol is according to: internet small computer systems interface; fibre channel; fibre channel over ethernet; network file system; or server message block; or another technology.

At block 209, the memory sub-system 110 communicates, the second control messages 137, generated by the local host system 120, to the storage device 105 of the memory sub-system 110.

At block 211, the storage device 105 processes the second control messages 137 and the first data messages 135 to provide network storage services to the remote host system 121.

For example, the controller 115 of the storage device 105 can have a local memory 119 used to buffer the second control messages 137 and the first data messages 135 (e.g., received in the host interface 109 out of order). The controller 115 can further include a processing device 117 configured via instructions and/or logic circuits to execute commands in the second control messages 137 and the first data messages 135 independent of the processing device 118 of the local host system 120.

In some implementations, the interconnect 103 is further connected to the local host system 120 as a computer peripheral bus according to: serial advanced technology attachment, peripheral component interconnect express, universal serial bus, fibre channel, serial attached small computer system interface, double data rate, small computer system interface, open NAND flash interface, low power double data rate, non-volatile memory express, or compute express link, another technology.

For example, the first data messages can include a read command 171 and a write command 175. In response to the read command 171, the storage device 105 can retrieve data 171 from its storage capacity 147, generate a second data message (e.g., response message 155) containing the retrieved data 173, and send, via the interconnect, the second data message (e.g., response message 155) from the storage device 105 for transmission using the network interface 113 without the second data message being buffered in the random-access memory 101.

For example, the first control messages 133 can include: a command to create, map, or delete a namespace; a credential to access a storage capacity of the storage device; a command to set a security attribute; and a command to adjust a storage configuration of the storage device, as illustrated in FIG. 3.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special-purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special-purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a storage manager configured to implement the functions discussed above. In some embodiments, the controller 115 in the memory sub-system 110 includes at least a portion of the storage manager. In other embodiments, or in combination, the controller 116 and/or the processing device 118 in the host system 120 includes at least a portion of the storage manager. For example, the controller 115, the controller 116, and/or the processing device 118 can include logic circuitry implementing the storage manager. For example, the controller 115, or the processing device 118 (processor) of the host system 120, can be configured to execute instructions stored in memory for performing the operations of the storage manager described herein. In some embodiments, the storage manager is implemented in an integrated circuit chip disposed in the memory sub-system 110. In other embodiments, the storage manager can be part of firmware of the memory sub-system 110, an operating system of the host system 120, a device driver, or an application, or any combination thereof.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations of a storage manager (e.g., to execute instructions to perform operations corresponding to operations described with reference to FIG. 1-FIG. 7). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory sub-system 110 of FIG. 1.

In one embodiment, the instructions include instructions to implement functionality corresponding to a storage manager (e.g., the operations described with reference to FIG. 1 to FIG. 7). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, over a computer network and in a network interface of a memory sub-system, packets sent by a remote host system;
generating, from the packets and in the memory sub-system, first control messages and first data messages;
buffering, in a random-access memory of the memory sub-system, the first control messages, wherein a local host system connected to the memory sub-system via a computer bus is configured to fetch the first control messages, process the first control messages, and generate second control messages;
sending, within the memory sub-system, the first data messages to a storage device of the memory sub-system without the first data messages being buffered in the random-access memory;
communicating, by the memory sub-system, the second control messages generated by the local host system to the storage device of the memory sub-system; and
processing, within the storage device, the second control messages and the first data messages to provide network storage services to the remote host system.

2. The method of claim 1, wherein the second control messages are communicated from the local host system to the storage device without being buffered in the random-access memory.

3. The method of claim 1, further comprising:
buffering, in the random-access memory of the memory sub-system, the second control messages generated by the local host system before sending the second control messages to the storage device.

4. The method of claim 1, further comprising:
connecting via an interconnect configured in the memory sub-system, the storage device, the random-access memory and the network interface.

5. The method of claim 4, wherein the interconnect is further connected to a processing device of the memory sub-system; and the generating of the first control messages and the first data messages are performed by the processing device in communication with the network interface over the interconnect.

6. The method of claim 4, wherein the network interface includes a processing device configured to perform the generating of the first control messages and the first data messages.

7. The method of claim 4, wherein the remote host system is configured to send storage requests to the network interface according to a first storage protocol; the first data messages are generated according to a second storage protocol, different from the first storage protocol, of the storage device; and the second storage protocol is according to:
   internet small computer systems interface;
   fibre channel;
   fibre channel over ethernet;
   network file system; or
   server message block.

8. The method of claim 4, wherein the storage device includes a solid-state drive having a host interface to receive the second control messages and the first data messages, and a local memory to buffer the second control messages and the first data messages.

9. The method of claim 4, wherein the interconnect is further connected to the local host system; and the interconnect includes a computer peripheral bus according to:
   serial advanced technology attachment;
   peripheral component interconnect express;
   universal serial bus;
   fibre channel;
   serial attached small computer system interface;
   double data rate;
   small computer system interface;
   open NAND flash interface;
   low power double data rate;
   non-volatile memory express; or
   compute express link.

10. The method of claim 4, wherein the first data messages include a read command; and the method further comprises:
   retrieving data from the storage device according to the read command;
   generating a second data message containing the data retrieved according to the read command; and
   sending, via the interconnect, the second data message from the storage device for transmission using the network interface without the second data message being buffered in the random-access memory.

11. The method of claim 10, wherein the first data messages further include a write command and host data to be written according to the write command.

12. A computing device, comprising:
   an interconnect;
   a microprocessor connected to the interconnect;
   a storage device having a controller, at least one memory device having memory cells formed on at least one integrated circuit die, and a host interface connected to the interconnect;
   a network interface connected to the interconnect; and
   a random-access memory connected to the interconnect;
   wherein the computing device is configured to:
      generate, from packets received in the network interface from a remote host system, first control messages and first data messages;
      buffer, in the random-access memory, the first control messages;
      execute instructions in the microprocessor to fetch the first control messages from the random-access memory, process the first control messages, and generate second control messages;
      send, via the interconnect, the first data messages to the storage device without the first data messages being buffered in the random-access memory;
      communicate, via the interconnect, the second control messages generated by the microprocessor to the storage device; and
      process, within the storage device, the second control messages and the first data messages to provide network storage services to the remote host system.

13. The computing device of claim 12, further comprising:
   a processing device connected to the interconnect and configured to generate the first control messages and the first data messages in communication with the network interface over the interconnect.

14. The computing device of claim 12, wherein the network interface includes a processing device configured to generate the first control messages and the first data messages and send the first data messages to the storage device using a peer to peer protocol.

15. The computing device of claim 12, wherein the remote host system is configured to send storage requests to the network interface according to a first storage protocol; and the first data messages are generated according to a second storage protocol, different from the first storage protocol, of the storage device.

16. The computing device of claim 15, wherein the controller includes a local memory to buffer the second control messages and the first data messages and a processing device to execute commands in the second control messages and the first data messages independent of the microprocessor.

17. The computing device of claim 16, wherein the first data messages include a read command and a write command; and the first control messages include:
   a command to create, map, or delete a namespace;
   a credential to access a storage capacity of the storage device;
   a command to set a security attribute; and
   a command to adjust a storage configuration of the storage device.

18. A memory sub-system, comprising:
   an interconnect connectable to a local host system having a microprocessor configured to function as a central processing unit for the memory sub-system;
   a network interface connected to the interconnect and configured to receive storage access request from a remote host system in a first storage protocol;
   a solid-state drive connected to the interconnect and operable according to a second storage protocol to provide storage services;
   a processing device configured to generate, based on the storage access requests from the remote host system, first control messages and first data messages according to the second storage protocol; and
   a random-access memory connected to the interconnect;
   wherein the processing device is configured to:
      buffer, in the random-access memory, the first control messages, wherein the microprocessor is configured via instructions to fetch the first control messages from the random-access memory, process the first control messages, and generate second control messages; and send, via the interconnect, the first data messages to the solid-state drive using a peer to peer protocol without the first data messages being buffered in the random-access memory; and wherein the solid-state drive is configured to process, the second control messages and the first data messages to provide network storage services to the remote host system.

19. The memory sub-system of claim 18, wherein the first data messages include a read command and a write command; and the first control messages include:
a command to create, map, or delete a namespace;
a credential to access a storage capacity of the storage device;
a command to set a security attribute; and
a command to adjust a storage configuration of the storage device.

20. The memory sub-system of claim 19, wherein the solid-state drive is configured to retrieve data according to the read command, generate a second data message containing the data retrieved according to the read command, and send the second data message for transmission using the network interface without the second data message being buffered in the random-access memory.

* * * * *